J. W. SANBORN.
AUTOMOBILE STEERING GEAR.
APPLICATION FILED APR. 10, 1914.
1,152,227.
Patented Aug. 31, 1915.
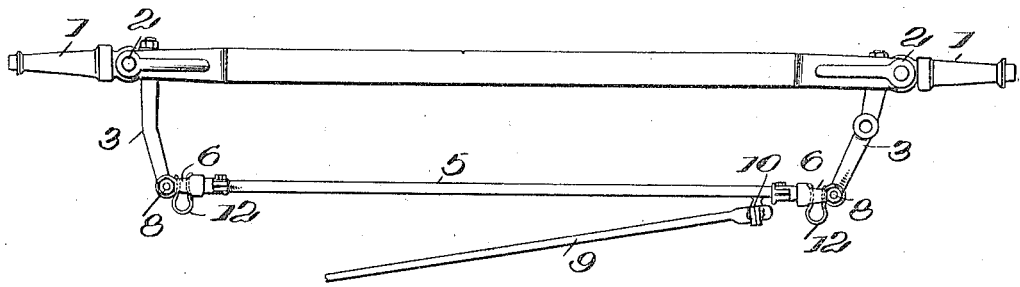
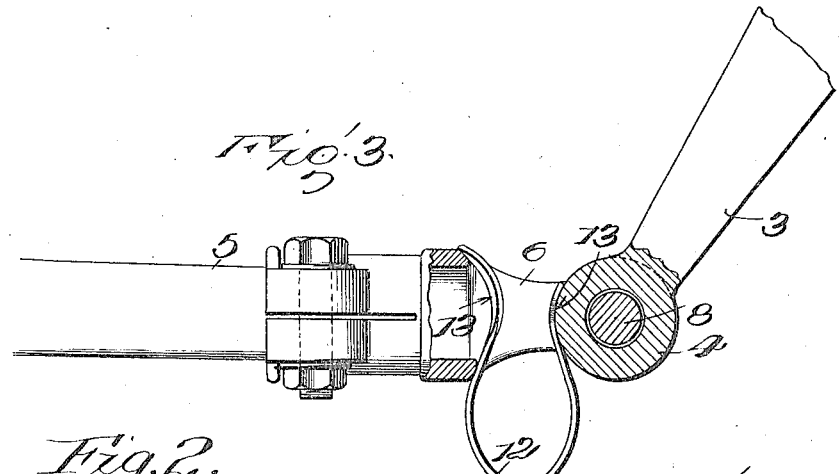
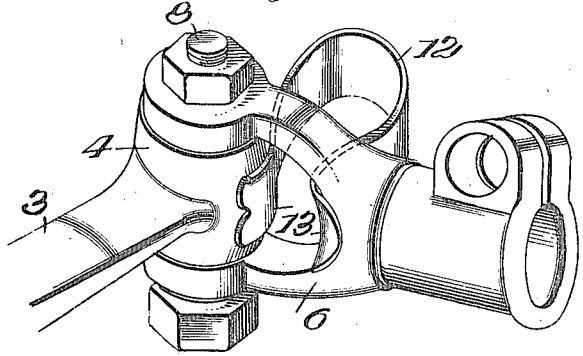
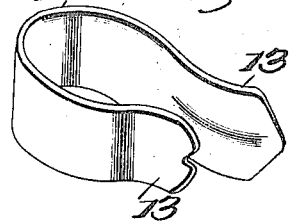

UNITED STATES PATENT OFFICE.

JAMES W. SANBORN, OF HAMPSTEAD, NEW HAMPSHIRE.

AUTOMOBILE STEERING-GEAR.

1,152,227.  Specification of Letters Patent.  Patented Aug. 31, 1915.

Application filed April 10, 1914. Serial No. 830,974.

*To all whom it may concern:*

Be it known that I, JAMES W. SANBORN, a citizen of the United States, residing at Hampstead, in the county of Rockingham and State of New Hampshire, have invented certain new and useful Improvements in and Relating to Automobile Steering-Gear, of which the following is a specification.

This invention relates to certain improvements in and relating to steering gear for automobiles and the like; and the objects and nature of the invention will be readily understood by those skilled in the art in the light of the following explanation of the accompanying drawings illustrating what I now believe to be the preferred embodiment or mechanical expression of my invention from among other formations and constructions within the spirit and scope of the invention.

I have discovered that the objectionable rattling and lost motion in certain types of automobile steering gear is due to excessive wear and looseness at the pivotal joints or couplings between the steering gear connecting rod yokes and the arms of the front wheel spindles, doubtless resulting from the thrust, pressure and shock concentrated on and to which said joints are subjected in holding the front wheels at the desired angle and against the constant tendency thereof to swing to the right or left; and that undue wear at these joints can be relieved and the excessive looseness and rattling of the steering gear can be prevented, by the introduction of yielding pressure in certain directions in said joints and acting on the members or parts thereof.

It is hence an object of my invention to provide simple, durable and comparatively inexpensive means for application to automobile steering gear approximately at the points mentioned for accomplishing the result stated.

The invention consists in certain combinations and arrangements of parts and in means for application to steering gear to maintain the same under certain anti rattling and anti-wearing tension, as more fully and particularly set forth and specified hereinafter.

Referring to the accompanying drawings;—Figure 1, is a plan view more or less diagrammatically illustrating automobile steering gearing including or involving my invention. Fig. 2, is a detail perspective on a larger scale than Fig. 1. Fig. 3, is a detail front view. Fig. 4, is a detail view of one of the springs or tension elements.

In the drawings, I show automobile steering gear comprising front wheel spindles 1, swingable horizontally on vertical axes 2, arranged at the opposite ends of the usual fixed front axle, to change the angle or direction of the front wheels toward the right or left as will be understood by those skilled in the art.

The spindles have the usual spindle arms 3, rigid therewith and extending rearwardly therefrom and by which the spindles are swung horizontally and the wheels are held against lateral deflection. The rear ends of the spindle arms 3, are formed with hubs or vertically elongated eyes 4, having vertical bearing openings extending therethrough. The two spindle arms 3, are pivotally connected to swing together by the spindle connecting rod 5, consisting of a long stiff straight rod at its ends having yokes 6, fixed thereto and straddling the bearing boxes or hubs 4, at the rear ends of the spindle arms. The yokes are Y-shaped or forked with their diverging arms arranged one over the other and having vertical alined bearing openings at their outer ends. The outer ends of the arms of the yokes fit the upper and lower ends of the hubs 4, with the bearing openings in the yoke ends and hub registering to receive the two vertical pivots 8, whereby the yokes are joined to the spindle arm ends.

The steering rod 9, is pivotally joined at 10, to the connecting rod to rec'procate the same for swinging the front wheels to the right or left and for holding said rod against longitudinal movement to maintain the wheels in the desired position. The steering rod 9, is operatively connected in any suitable manner to the automobile steering post and is actuated and held thereby.

The front wheels of an automobile are subjected to tremendous lateral strains, thrusts and shocks, tending to throw said wheels to the right and left and the strain of holding the wheels in the desired positions and of shifting the wheels is concentrated on the bearing surfaces at the vertical axes 8, coupling the spindle arms to the connecting rod yokes and hence said bearing surfaces are subject to excessive wear and consequent objectionable lost motion and rattling. I have reduced this objectionable wear, lost motion and looseness to the minimum by introducing means between the spindle arm ends and the connecting rod ends to maintain the spindle arm ends under a constant tension tending to always yieldingly hold said arms swung outwardly in opposite directions to their limits of movement away from the connecting rod ends, that is, out of the connecting rod end yokes. In other words, I provide spring means constantly acting on the spindle arms to yieldingly hold said arms swung outwardly (away from the connecting rod ends) and consequently the spindles swung forwardly to their limits of swing independently of the connecting rod, as far as permitted by the vertical axes 8, pivotally joining the spindle arms and connecting rod yokes. Thus the thrusts of the vehicle front wheels tending to swing the spindles and their arms will be partially cushioned by said spring devices and wear will be thereby reduced to the minimum. Also, when the connecting rod is moved longitudinally to swing the spindles the same cushioning effect will take place and the tension on one spring device will be slightly decreased and the tension of the other slightly increased, but at all times the tendency of the connecting rod to vibrate and rattle will be reduced and wear and the transmission of vibration therefrom to the steering rod will be thereby reduced.

In the particular example illustrated, each spring device consists of a comparatively strong heavy U-shaped plate spring 12, having its comparatively elongated spaced legs converging toward each other with their extremities deflected outwardly to diverge thereby forming the end portions of the legs with transverse outer side depressions 13. This spring is formed to be inserted from the rear or forwardly through the opening in the inner end of a connecting rod yoke intervening between the spindle arm hub and the closed inner end of the yoke, and to bear in opposite directions against the closed end of the yoke and the hub of the arm to attain the result hereinbefore recited. I employ two similar springs at the ends of the connecting rod and these springs are so formed that they must be compressed and held under tension (by pressing the legs of a spring toward each other) while being inserted into position in the yokes so that when they snap into place in the yokes they will be under constant tension in the directions hereinbefore mentioned.

The end portions of the spring legs are formed with the opposite recesses to partially fit around the surfaces of the arm hubs and yoke ends and thereby retain the springs in place and against accidental displacement from the yokes.

The springs when in operative position in the steering gear preferably do not extend forwardly beyond the connecting rod yokes but do project rearwardly a distance beyond the yokes, and hence in no way interfere with moving parts of the steering gear.

The springs can be readily inserted in steering gear of the type noted, by utilizing suitable implements to hold the springs compressed while being inserted through the yokes.

I do not wish to limit all features of my invention to the exact form or shape or character of spring disclosed although the springs can be made for application to steering gears and thus sold so that automobile users can readily apply the same and thus effect the combination of my invention, and it is evident that various modifications and variations might be resorted to without departing from the spirit and scope of my invention, and hence I do not wish to limit myself to the exact disclosure hereof.

What I claim is:—

In automobile steering gear, horizontally swingable spindles for the vehicle steering wheels having rearwardly extending arms and a connecting rod pivotally coupled to and joining said arms, in combination with springs inserted between the rod and arms to constantly maintain the arms at their limits of outward movement in directions away from the rod ends.

In testimony whereof I affix my signature in presence of two witnesses.

JAMES W. SANBORN.

Witnesses:
 JOHN C. SANBORN,
 CHARLES W. GARLAND.